United States Patent
Seya et al.

[11] Patent Number: 5,247,811
[45] Date of Patent: Sep. 28, 1993

[54] PRODUCTION AND HEAT STORAGE SYSTEM FOR LOW-TEMPERATURE CHILLED WATER

[75] Inventors: Yoshimi Seya; Seishiro Igarashi; Masaya Tachibana, all of Tokyo, Japan

[73] Assignee: Shimizu Construction Co., Ltd, Tokyo, Japan

[21] Appl. No.: 790,303

[22] Filed: Nov. 12, 1991

[30] Foreign Application Priority Data

Nov. 15, 1990 [JP] Japan ................. 2-309345

[51] Int. Cl.$^5$ ............................. F25D 17/02
[52] U.S. Cl. .................. 62/434; 62/430; 62/201; 62/185
[58] Field of Search .......... 62/430, 434, 201, 185

[56] References Cited

U.S. PATENT DOCUMENTS

| | | | |
|---|---|---|---|
| 3,365,904 | 1/1968 | Ross | 62/185 X |
| 3,922,876 | 12/1975 | Wetherington, Jr. et al. | 62/185 X |
| 4,191,027 | 3/1980 | Inoue | 62/434 X |
| 4,364,242 | 12/1982 | Smith | 62/434 |
| 4,502,289 | 3/1985 | Kayama | 62/185 |
| 4,554,797 | 11/1985 | Goldstein | 62/185 X |
| 4,596,120 | 6/1986 | Knodel et al. | 62/434 X |
| 4,850,201 | 7/1989 | Oswalt et al. | 62/185 |
| 4,984,628 | 1/1991 | Uchida et al. | 62/434 X |
| 5,018,367 | 5/1991 | Yamada et al. | 62/434 X |
| 5,072,596 | 12/1991 | Gilbertson et al. | 62/185 |

FOREIGN PATENT DOCUMENTS

| | | | |
|---|---|---|---|
| 0145319 | 12/1980 | German Democratic Rep. | 62/434 |
| 0128043 | 6/1986 | Japan | 62/185 |

Primary Examiner—Henry A. Bennet
Assistant Examiner—Christopher B. Kilner
Attorney, Agent, or Firm—Armstrong, Westerman, Hattori, McLeland & Naughton

[57] ABSTRACT

The present invention includes a heat storage tank (1) with a built-in suction chamber (2), a first heat source unit (R-1) and a first pump (P-1) for pumping up water from the high-temperature side (3) of said heat storage tank (1) and supplying the chilled water into said suction chamber (2), a low-temperature heat exchanger (5) for exchanging heat between water and an antifreeze solution, a second pump (P-2) for pumping up water from said suction chamber (2) and supplying the water chilled by the antifreeze solution in said low-temperature heat exchanger (5) to the low-temperature side (4) of said heat storage tank (1) and a second heat source unit (R-2) and a third pump (P-3) for cooling the antifreeze solution in an antifreeze solution tank (6) and feeding it to said low-temperature heat exchanger (5), and is designed to variably control the flow rates of said first and second pumps (P-1 and P-2) in dependence upon their suction temperatures.

4 Claims, 3 Drawing Sheets

PRODUCTION AND HEAT STORAGE SYSTEM FOR LOW-TEMPERATURE CHILLED WATER

BACKGROUND OF THE INVENTION

The present invention relates to a production and heat storage system for low-temperature chilled water, which enables fresh water or a heat carrier (heating medium) to be cooled down to around the freezing temperature, using a combination of two heat source units making use of a low-pressure refrigerant with a heat storage tank.

As known heretofore in the art, heat sources for air-conditioning purposes has been produced by a system wherein, as illustrated in FIG. 5, cold water is supplied to the low-temperature (condenser) side of a refrigerating machine and the chilled water obtained on the high-temperature (evaporator) side thereof is pumped up to a heat storage tank for recycling. This system is designed to store chilled water in the nighttime making use of inexpensive "midnight power" and utilize the heat in the daytime, and is thus efficient enough.

With the above-mentioned conventional system for producing chilled water, however, the lower temperature limit of chilled water for heat storage is at most ca. 5° C.; chilled water of around 0° C. cannot be produced due to a water-freezing problem. When water is cooled down to around 0° C., the temperature of refrigerant used on the evaporator side of the refrigerating machine must be lower than that of the water to be chilled. Cooling the refrigerant down to a temperature of around 0° C. may possibly be achievable by increasing the heating surface area of a heat exchanger to infinity. Due to a water-freezing problem, however, a currently available temperature difference between water and refrigerant is actually on the order of 3° C.; in other words, the temperature of refrigerant is at least 1° C. while the exit temperature of chilled water is ca. 4° C. Furthermore, it is impossible to keep all the flow rates in heat exchanger tubes constant due to some limitation placed on the control mechanism of the refrigerating machine. Nor can the temperature of refrigerant be always kept constant. For these reasons and because of a temperature change of about ±0° C. occurring actually, chilled water of around 0° C. cannot be produced as yet.

In addition to cooling systems operated on condition that recycling fresh water may be frozen, there are some systems for producing chilled fresh water of 1 to 2° C. with refrigerating machines and heat exchangers using a high-pressure refrigerant.

With these systems designed such that the recycling water to be chilled flows along the shell of the heat exchanger, however, it is impossible to obtain chilled water of 1° C. or lower. Nor can a temperature difference as large as 100° C. or more be removed by one-cycle cooling due to their single-stage cooling design. It is thus unfeasible to achieve heat storage at a temperature as low as 1° C. or lower with enhanced efficiency, making use of a perfect mixing type of multi-tank unit often used as a heat storage water tank for cooling-and-heating purposes.

SUMMARY OF THE INVENTION

Seeking to provide a solution to the above-mentioned problems, this invention has for its object to provide a production and heat storage system for chilled water of low temperature, which uses a refrigerating machine or heat pump machine making use of a low-pressure refrigerant as a cooling heat source unit to cool fresh water or a heat carrier of 10° C. or higher drastically down to around the freezing temperature in a stable manner, thereby enabling chilled water of low temperature to be produced with higher efficiency.

Still other objects and advantages of the invention will in part be obvious and will in part be apparent from the specification.

More specifically, the production and heat storage system for chilled water of low temperature according to this invention is characterized by including a heat storage tank with a built-in suction chamber, a first heat source unit and a first pump for pumping up water from the high-temperature side of said heat storage tank and supplying the chilled water into the suction chamber, a low-temperature heat exchanger for exchanging heat between water and an antifreeze solution, a second pump for pumping up water from said suction chamber and supplying the water chilled by the antifreeze solution in said low-temperature heat exchanger to the low-temperature side of said heat storage tank and a second heat source unit and a third pump for cooling the antifreeze solution in an antifreeze solution tank and feeding it to said low-temperature heat exchanger, and by variably controlling the flow rates of said first and second pumps in dependence upon their suction temperatures, whereby the outputs of said heat source units are made good enough and the exit temperature of chilled water is always kept constant at a rated temperature.

According to this invention, it is possible to obtain a stable antifreeze solution of low temperature by using two heat source units, one for high-temperature cooling and the other for low-temperature cooling and utilizing the low-temperature heat exchanger for heat exchange with water. In this case, it is possible to prevent a breaking-down by freezing of low-temperature heat exchanger tubes—which may otherwise be caused by control troubles—by utilizing the heat capacity of an antifreeze solution constantly stored at a plus temperature in the tank located on the entrance side of the second heat source unit, and it is easy to keep the antifreeze solution entrance temperature constant because said heat source unit can be well controlled. By variably controlling the flow rates of the pumps on the sides of the first heat source unit and low-temperature heat exchanger, the exit temperature of cold water is always kept constant at the rated value while maintaining the rated output. The suction chamber is used as a cushion for temperature variations, and the suction temperature of the pump located on the low-temperature heat exchanger side is always kept at a given value or more while the suction temperature of the pump located on the first heat source unit has been increased a little earlier to the rated value.

DESCRIPTION OF THE PREFERRED EMBODIMENTS

The present invention will now be explained at great length with reference to the accompanying drawings.

Figure 1:
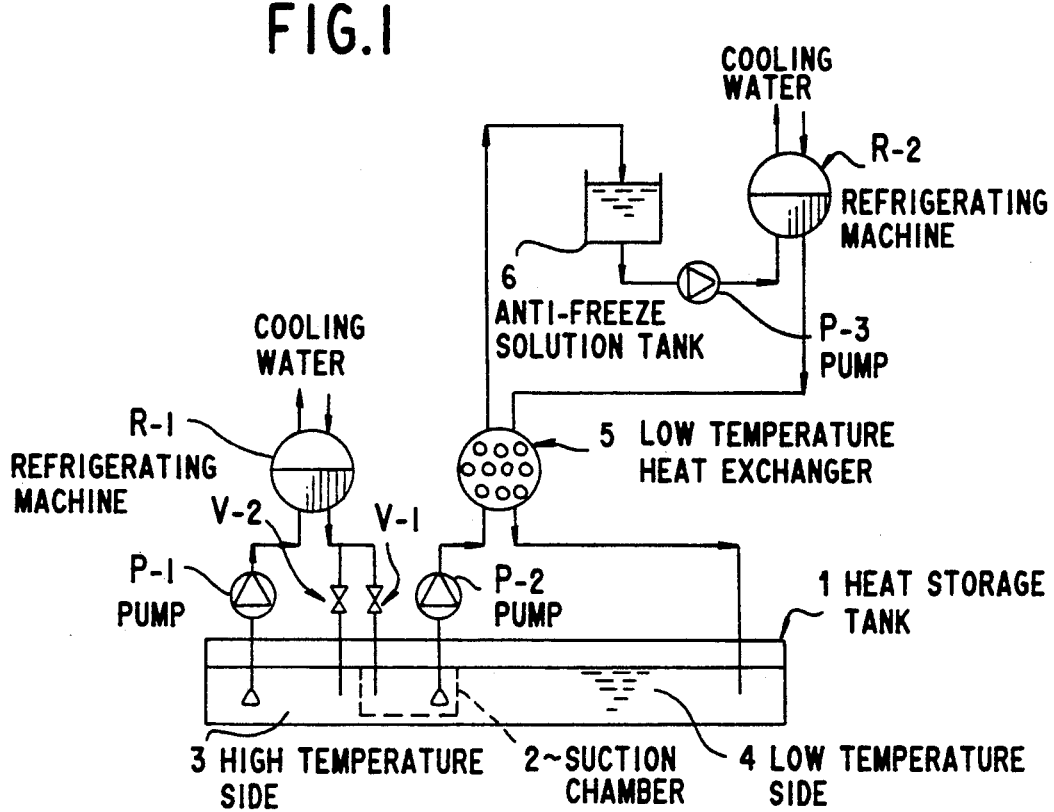
FIG. 1 is a schematic diagram showing one embodiment of the production and heat storage system for low-temperature chilled water.

Referring now to FIG. 1, the production and heat storage system for low-temperature chilled water is substantially built up of a heat storage tank 1 in which fresh water or heat carrier (hereinafter defined simply as water) is to be filled, a suction chamber 2 located within the heat storage tank 1, a refrigerating machine R-1 that is a first heat source unit, a refrigerating machine R-2 that is a second heat source unit, a first pump P-1, a second pump P-2, a third pump P-3, a low-temperature heat exchanger 5 and an antifreeze solution tank 6. It is noted that while a low-pressure refrigerant is used in conjunction with the heat source units, heat pump units may be used in place of the refrigerating machines.

Cooling water is supplied to the condenser side of the first refrigerating machine R-1, and the inlet of the refrigerating machine R-1 located on the evaporator side and the high-temperature side 3 of the heat storage tank 1 are piped with each other through the first pump P-1, while the outlet of the refrigerating machine R-1 located on the evaporator side is piped within the heat storage tank 1 and the suction chamber 2 through control valves V-2 and V-1, respectively.

The suction chamber 2 within the heat storage tank 1 and the low-temperature side 4 thereof are both piped with the cold water side of the low-temperature heat exchanger 5 through the second pump P-2. In addition, another cooling water is supplied to the condenser side of the second refrigerating machine R-2, while the evaporator side of the refrigerating machine R-2 and the antifreeze solution side of the low-temperature heat exchanger 5 are piped with each other through the 3rd pump P-3 and the antifreeze solution tank 6. It is noted that with the low-temperature heat exchanger 5 designed such that the antifreeze solution flows along the shell and the fresh water or heat carrier flows from the heat storage tank along the tubes, it is possible to cool the fresh water or heat carrier down to between some 13° C. and around 0° C. with high efficiency but without recourse to any ice making function.

Figure 2:
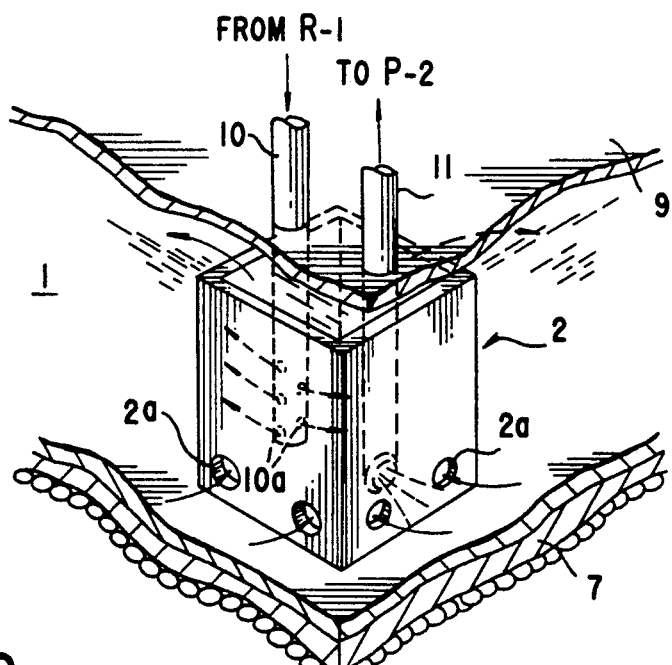
FIG. 2 is a perspective view of the suction chamber shown in FIG. 1, FIGS. 3 and 4 are graphs showing the relations between the pump flow rate and the temperature of chilled water.

As can be best seen from Fig. 2, the suction chamber 2 in a box form having an opening on the upper side is received in the heat storage tank 1 disposed between the groundwork 7 and a floor 9. Around the suction chamber 2 there are provided a plurality of water inlet holes 2a, and within the suction chamber 2 there are inserted a pipe 10 extending from the first refrigerating machine R-1 and a pipe 11 extending to the second pump P-2. The pipe 10 includes a number of water outlet holes 10a.

How the above-mentioned system of this invention operates will now be explained in greater detail.

Figure 3:
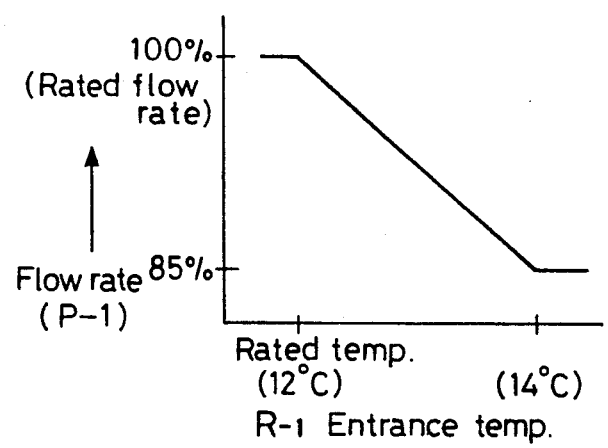

In order for the system to operate for heat storage at night, the control valve V-1 is held open, while the control valve V-2 is shut up. On the side of the first refrigerating machine R-1, the flow rate of the first pump P-1 is variably controlled. To be more exact, when the chilled water entrance temperature of the first refrigerating machine R-1 on the evaporator side is higher than a predetermined rated temperature (e.g. 12° C.) as illustrated in FIG. 3, the flow rate of the first pump P-1 is reduced to 85% of the rated value, and at the rated temperature, it is maintained at the rated flow rate. This enables the capacity of the first refrigerating machine R-1 to be utilized to the maximum, thereby always keeping the chilled water exit temperature constant at a predetermined rated temperature (e.g. 5° C.) even when the chilled water entrance temperature on the evaporator side is high. When the chilled water entrance temperature of the first refrigerating machine R-1 on the evaporator side is lower than the rated temperature, the chilled water exit temperature can always be controlled at the rated temperature (e.g. 5° C.) through the capacity control mechanism of the refrigerating machine R-1 proper.

Figure 4:
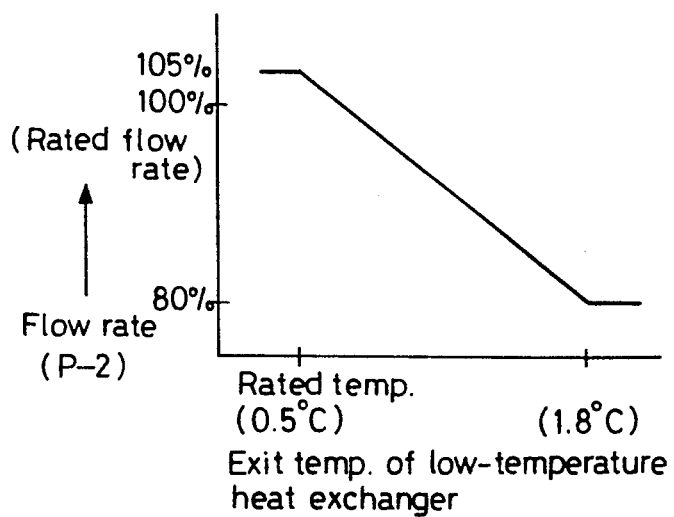
Figure 5:
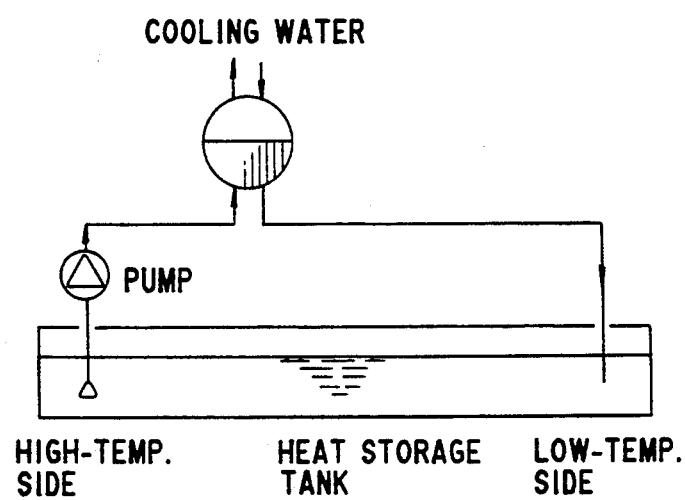
FIG. 5 is a diagram showing a conventional production and heat storage system for chilled water.

On the chilled water side of the low-temperature heat exchanger 5, the flow rate of the second pump P-2 is also variably controlled. In other words, when the chilled water exit temperature of the low-temperature heat exchanger 5 is higher than a predetermined rated temperature (e.g. 0.5° C.) as illustrated in FIG. 4, the flow rate of the second pump P-2 is reduced to 80% of a predetermined rated value, and at the rated temperature, it is increased to 105% of the rated value, thereby preventing a lowering of the chilled water exit temperature and always maintaining it constant at the rated temperature (e.g. 0.5° C.).

In order to cool the chilled water side of the low-temperature heat exchanger 5, the antifreeze solution is fed to the low-temperature heat exchanger 5 by way of the second refrigerating machine R-2, which is controlled by its own capacity control mechanism such that the antifreeze solution exit temperature of the refrigerating machine R-2 is always kept constant. The use of the antifreeze solution enables the refrigerating machine R-2 to produce an antifreeze solution at a stable rated temperature (of $-1.8°$ C.).

In the present invention the antifreeze solution tank 6 is provided on the inlet side of the second refrigerating machine R-2 for two major reasons. One reason is that when chilled water is cooled down to around the freezing point in the low-temperature heat exchanger 5, the capacity of the refrigerating machine R-2 is forcedly decreased by its own capacity control mechanism to increase the antifreeze solution exit temperature of the refrigerating machine R-2, thereby feeding the high-temperature antifreeze solution stored so far in the antifreeze solution tank 6 to the low-temperature heat exchanger 5 rapdily and over an extended period of time. Another reason is to prevent the antifreeze solution exit temperature of the low-temperature heat exchanger 5, viz., the antifreeze solution entrance temperature of the refrigerating machine R-2 from varying drastically when there is a load variation in the low-temperature heat exchanger 5. To this end, the antifreeze solution is stored in the antifreeze solution tank 6 on the entrance side of the refrigerating machine R-2 for some time to prevent a drastic change in the antifreeze solution entrance temperature of the refrigerating machine R-2 and assist the capacity control mechanism of the refrigerating machine R-2 proper, thereby preventing a sharp variation in the antifreeze solution exit temperature of the refrigerating machine R-2 and so always placing it under control at the predetermined temperature.

How the suction chamber 2 operates will be explained below.

In the present invention, the suction chamber 2 serves as a cushion, rather than as means for feeding chilled water from the exit of the first refrigerating machine R-1 directly to the low-temperature heat exchanger 5, thereby preventing a temperature variation in the chilled water leaving the refrigerating machine R-1 from becoming a direct disturbing factor for the chilled water entrance temperature of the low-temperature heat exchanger 5.

When the chilled water exit temperature of the first refrigerating machine R-1 drops to the rated value (5° C.) or below, it would be expected that the flow rate of the first pump R-1 would have a maximum rated value of 100% while the chilled water exit temperature of the low-temperature heat exchanger 5 would drop to the rate value (of 0.5° C.) or below. Then, the flow rate of the second pump P-2 would have a maximum value (of 105%). Hence, if the flow rates of the pumps P-1 and P-2 have the same value, a difference between the maximum flow rate values would then be 5% (105−100). This means that hot water (of 12°−14° C.) enters from the heat storage tank 1 into the suction chamber 2 through its inlet holes 2a, where it is mixed with cold water (of 5° C. or lower) from the refrigerating machine R-1 with the result that the cold water entrance temperature of the low-temperature heat exchanger 5 is kept at 5° C. or more.

At an initial time of operation of the present system, it is in some cases impossible to obtain cold water of 5° C. from the first refrigerating machine R-1 even when the flow rate of the pump P-1 is dropping to the minimum (85% of the rated flow rate) at a first pump's suction temperature of 14° C. or higher. In such cases, it would be expected that the cold water entrance temperature of the low-temperature heat exchanger 5 would lie at the rated value (of 5° C.) or more and the flow rate would reach a maximum (85% of the rated value) as well. At this time, an amount of water corresponding to a flow rate difference of 5% (85−80) overflows from the suction chamber 2 into the suction side of the first pump P-1. This results in a lowering of the entrance temperature of the refrigerating machine R-1, thereby keeping the cold water exit temperature of the refrigerating machine R-1 and the cold water entrance temperature of the low-temperature heat exchanger 5 constant at the rated value (of 5° C.).

The heat storage system is designed to store chilled water in the nighttime making use of inexpensive "midnight power" and use of the heat in the daytime without reliance on a refrigerating machine, if possible.

Therefore, in a time zone in which no heat storage is needed, e.g. in the daytime, the control valves V-1 and V-2 are remotely controlled to off and on states, respectively, where only the first refrigerating machine R-1 is operating to cool the heat carrier of some 13° C. to a temperature of about 5° C. Thus, switching of operation between daytime and nighttime makes high-density heat storage and efficient operation feasible.

The present system as mentioned above has a number of merits. Among them:

1) It is possible to improve the COP of the total system by using two heat source units, one for high-temperature cooling and the other for low-temperature cooling.

2) It is possible to produce a stable antifreeze solution of low temperature with high efficiency by using the second heat source unit to cool an antifreeze solution and employing the low-temperature heat exchanger for heat exchange with water.

3) It is possible to prevent a breaking-down by freezing of low-temperature heat exchanger tubes—which may otherwise be caused by control troubles—by utilizing the heat capacity of an antifreeze solution constantly stored at a plus temperature in the tank located on the entrance side of the second heat source unit, and it is easy to keep the antifreeze solution entrance temperature constant because said heat source unit can be well controlled.

4) By variably controlling the flow rates of the pumps on the sides of the first heat source unit and low-temperature heat exchanger, the exit temperature of cold water is always kept constant at the rated value while maintaining the rated output.

5) The suction chamber is used as a cushion for temperature variations, and the suction temperature of the pump located on the low-temperature heat exchanger side is always kept at the preset value or more while the suction temperature of the pump located on the first heat source unit has been increased a little earlier to the rated value.

What is claimed is:

1. A production and heat storage system for chilled water of low temperature comprising:
   a) an heat storage tank;
   b) a suction chamber located within said heat storage tank an dividing said tank into a high temperature side and a low temperature side;
   c) a first heat source unit comprising a first pump, a first refrigeration machine, and means for pumping up water from said high temperature side of said heat storage tank and supplying chilled water into said suction chamber;
   d) means for detecting the chilled water temperature at (a) entrance and an exit of the first refrigeration machine;
   e) means for controlling (a) flow rate of said first pump, whereby the exit temperature of the chilled water is always kept constant at a rated temperature;
   f) a second heat source unit comprising a second pump, a low temperature heat exchanger, and means for connecting said suction chamber, said second pump, said low temperature heat exchanger and said low temperature side of said heat storage tank; an anti-freeze solution tank, a third pump, a second refrigeration machine, and means for connecting said anti-freeze solution tank, third pump and second refrigeration machine through said low temperature heat exchanger;
   g) means for controlling the flow rates through said first pump and said second pump in dependence upon the entrance and exit temperature of said chilled water at said first refrigeration machine and said low temperature heat exchanger respectively.

2. A system as claimed in claim 1, characterized in that said antifreeze solution tank is provided on the suction side of said second heat source unit.

3. A system as claimed in claim 1 or 2 wherein a first pipe for supplying the water chilled by said first heat source unit into said suction chamber is arranged in parallel with a second pipe for supplying said water into said heat storage tank, said water being fed through said first pipe during heat storage while said water being fed through said second pipe when no heat storage is needed.

4. A system according to claim 1, wherein means is provided for selectively supplying the water chilled by said first heat source unit into an inside or an outside of said suction chamber, and for supplying said water into the inside of the suction chamber during heat storage and through the outside of the suction chamber when no heat storage is needed.

* * * * *